(12) United States Patent  (10) Patent No.: US 6,640,384 B2
Sanders et al.  (45) Date of Patent: Nov. 4, 2003

(54) CONVERTIBLE BLOWER AND VACUUM

(75) Inventors: Daniel Sanders, Horatio, AR (US);
Sieglinde J. Verges, Texarkana, TX (US); Terry Jewell, Macon, GA (US); Tomas Pribanic, Miami, FL (US); David Wiseman, Bel Air, MD (US)

(73) Assignee: Electrolux Home Products, Inc., Cleveland, OH (US)

( * ) Notice: Subject to any disclaimer, the term of this patent is extended or adjusted under 35 U.S.C. 154(b) by 15 days.

(21) Appl. No.: 09/974,310

(22) Filed: Oct. 10, 2001

(65) Prior Publication Data

US 2003/0066159 A1 Apr. 10, 2003

(51) Int. Cl.⁷ .................................................. A47L 5/14
(52) U.S. Cl. .......................................... 15/330; 15/405
(58) Field of Search ........................ 15/330, 344, 405; 439/456, 457, 459

(56) References Cited

U.S. PATENT DOCUMENTS

| 1,583,528 | A | * | 5/1926 | Clements | ...................... | 15/328 |
|---|---|---|---|---|---|---|
| 2,430,552 | A | | 11/1947 | Bernal | | |
| 3,130,678 | A | | 4/1964 | Chenault | | |
| 3,147,510 | A | | 9/1964 | Thompson | | |
| 3,172,743 | A | | 3/1965 | Kowalewski | | |
| 3,180,071 | A | | 4/1965 | Nolte | | |
| 3,618,157 | A | | 11/1971 | Bassin | | |
| 4,070,771 | A | | 1/1978 | Yakiwchuk | | |
| 4,227,280 | A | | 10/1980 | Comer | | |
| D258,908 | S | | 4/1981 | Satoh | | |
| 4,288,886 | A | | 9/1981 | Siegler | | |
| 4,290,165 | A | | 9/1981 | Hiramatsu et al. | | |
| D263,547 | S | | 3/1982 | Carsello | | |
| 4,325,163 | A | | 4/1982 | Mattson et al. | | |
| 4,329,757 | A | | 5/1982 | Ramstrom et al. | | |
| 4,451,951 | A | | 6/1984 | Satoh | | |
| 4,615,069 | A | | 10/1986 | Henning | | |
| 4,644,606 | A | | 2/1987 | Luerken et al. | | |
| 4,674,146 | A | | 6/1987 | Tuggle et al. | | |
| 4,694,528 | A | | 9/1987 | Comer et al. | | |
| 4,713,858 | A | | 12/1987 | Kelber | | |
| 4,756,668 | A | | 7/1988 | Gassen et al. | | |
| 4,797,072 | A | | 1/1989 | Berfield et al. | | |
| 4,800,614 | A | | 1/1989 | Kopco et al. | | |
| 4,809,398 | A | | 3/1989 | Linduist et al. | | |
| 4,836,753 | A | | 6/1989 | Berfield et al. | | |
| RE33,050 | E | | 9/1989 | Tuggle et al. | | |
| 4,870,714 | A | | 10/1989 | Miner | | |

(List continued on next page.)

Primary Examiner—Terrence R. Till
(74) Attorney, Agent, or Firm—Marc A. Hubbard; Munsch Hardt Kopf & Harr, P.C.

(57) ABSTRACT

A portable blower-vacuum includes a housing having an inlet and an outlet. A motor is disposed within the housing for rotatably driving an impeller to transfer an airflow from the inlet to the outlet. The blower-vacuum also includes an elongated air outlet structure over which an elongated blower tube may be slid for attachment in a blower mode and removed in a vacuum mode. The outlet structure possesses a configuration that improves the ease with which the blower tube may be fitted to the air outlet. The blower-vacuum also includes a cover disposed over the inlet in a blower mode and a skirt adapted to cooperate with the cover and the inlet to substantially reduce or eliminate lateral airflow from entering the inlet from between the cover and the housing.

31 Claims, 5 Drawing Sheets

U.S. PATENT DOCUMENTS

| | | | |
|---|---|---|---|
| 4,875,879 A | * 10/1989 | Bunyea et al. | 439/501 |
| 4,884,314 A | 12/1989 | Miner et al. | |
| 4,945,604 A | 8/1990 | Miner et al. | |
| 4,947,513 A | 8/1990 | Everts | |
| 5,003,662 A | 4/1991 | Everts | |
| 5,011,058 A | 4/1991 | Sapp et al. | |
| 5,025,529 A | 6/1991 | Hult et al. | |
| 5,035,586 A | 7/1991 | Sadler et al. | |
| D319,902 S | 9/1991 | Russell | |
| 5,050,266 A | 9/1991 | Schneider | |
| D322,971 S | 1/1992 | Tuggle et al. | |
| 5,218,736 A | 6/1993 | Bartasevich et al. | |
| 5,222,275 A | 6/1993 | Baker et al. | |
| 5,245,726 A | 9/1993 | Rote et al. | |
| 5,269,665 A | 12/1993 | Sadler et al. | |
| 5,294,063 A | 3/1994 | Bote | |
| 5,318,158 A | * 6/1994 | Seasholtz | 191/12 R |
| 5,349,721 A | 9/1994 | Iida | |
| 5,404,614 A | 4/1995 | Stephens | |
| 5,410,775 A | 5/1995 | Frazier | |
| 5,440,781 A | 8/1995 | Kitazawa et al. | |
| D363,149 S | 10/1995 | Franke et al. | |
| 5,511,281 A | 4/1996 | Webster | |
| 5,522,115 A | 6/1996 | Webster | |
| 5,535,479 A | 7/1996 | Pink et al. | |
| 5,560,078 A | 10/1996 | Toensing et al. | |
| 5,584,436 A | 12/1996 | Sepke | |
| 5,586,359 A | 12/1996 | Iida | |
| 5,588,178 A | 12/1996 | Liu | |
| 5,604,954 A | 2/1997 | Webster et al. | |
| 5,606,769 A | 3/1997 | Tomasiak et al. | |
| 5,611,107 A | 3/1997 | Tomasiak et al. | |
| 5,620,336 A | 4/1997 | Worthing | |
| 5,638,574 A | 6/1997 | Haupt et al. | |
| 5,659,920 A | 8/1997 | Webster et al. | |
| 5,661,873 A | 9/1997 | Karet | |
| 5,673,457 A | 10/1997 | Webster et al. | |
| 5,689,852 A | 11/1997 | Svoboda et al. | |
| 5,692,262 A | 12/1997 | Haupt et al. | |
| 5,711,048 A | 1/1998 | Pink et al. | |
| 5,722,111 A | 3/1998 | Sowell et al. | |
| 5,768,749 A | 6/1998 | Ohi et al. | |
| 5,894,630 A | 4/1999 | Bitner et al. | |
| 5,957,721 A | * 9/1999 | Searle et al. | 439/501 |
| 5,979,013 A | 11/1999 | Beckey et al. | |
| 6,000,096 A | 12/1999 | Everts et al. | |
| 6,003,199 A | 12/1999 | Shaffer | |
| 6,009,595 A | 1/2000 | Leasure et al. | |
| RE36,627 E | 3/2000 | Pink et al. | |
| 6,044,519 A | 4/2000 | Hendrix | |
| 6,055,700 A | 5/2000 | Holsten et al. | |
| 6,059,541 A | 5/2000 | Beckey et al. | |
| 6,108,865 A | 8/2000 | Veser et al. | |
| 6,490,756 B2 | * 12/2002 | Marshall et al. | 15/405 |

* cited by examiner

CONVERTIBLE BLOWER AND VACUUM

TECHNICAL FIELD OF THE INVENTION

The present invention relates generally to a portable apparatus for blowing and vacuuming outdoor areas.

BACKGROUND OF THE INVENTION

Portable blower-vacuum devices are generally used to clean outdoor areas of leaves, grass clippings, and other debris. Conventional blower-vacuum devices generally include a housing containing a motor, such as an electric motor or an internal combustion engine, and an impeller. The impeller is driven by the motor to generate an airflow from an inlet of the housing to an outlet of the housing. In a blower mode of operation, an elongated tube may be secured to the housing outlet for directional control of the airflow. In a vacuum mode of operation, an elongated tube may be secured to the housing inlet and a debris collection bag may be secured to the housing outlet.

Efforts have been made in the past to develop lightweight and relatively compact blower-vacuums that provide for easy transportation and manipulation of the blower-vacuums during use. Prior efforts have also focused on increasing the airflow of the blower-vacuum while maintaining a relatively light-weight and energy efficient power supply, reducing vibration of the blower-vacuum during use, and providing additional safety and functional features.

SUMMARY OF THE INVENTION

The present invention pertains to improvements to leaf blowers and blower-vacuums that addresses shortcomings and disadvantages associated with prior leaf blowers and blower-vacuums.

In accordance with an embodiment of one aspect of the present invention, an elongated air outlet structure of a convertible blower-vacuum, over which an elongated blower tube may be slid for attachment in a blower mode and removed in a vacuum mode, possesses a configuration that improves the ease with which the blower tube may be fitted to the air outlet. An edge of an opening in the housing defining the air outlet lies within a plane to which the axis of the outlet is not normal. The orientation of the opening assists with sliding a tube over the outlet.

In accordance with an embodiment of another aspect of the present invention, a portable blower-vacuum includes a housing of an impeller having an inlet and an outlet. A motor rotatably drives the impeller for generating an airflow from the inlet to the outlet of the housing. A cover that cooperates with the inlet in a blower mode includes a plurality of apertures disposed relative to the inlet to provide an airflow path directly into the inlet. The blower-vacuum also includes a skirt adapted to cooperate with the inlet and the cover to substantially reduce or eliminate a lateral airflow from entering the inlet by, for example, bypassing the apertures of the cover, thereby maintaining a substantially columnar airflow pattern to the inlet. A lateral or cross-directional airflow increases turbulence around the inlet. Reducing the cross-directional airflow improves performance of the blower-vacuum, resulting in an increased velocity of air at the outlet when in a blower mode.

According to an embodiment of another aspect of the present invention, a portable leaf blower includes a strain reliever adapted to substantially prevent inadvertent disengagement of an electrical power supply from an electric motor of the blower. The strain reliever includes an opening disposed near a rearward portion of the housing of the blower. A loop of an electrical cord is inserted through the opening to engage a cleat. A receptacle is located upwardly from the ring to receive a corresponding plug of the electrical cord. Forces that would otherwise disconnect the plug from the receptacle are absorbed by the ring and the cleat, thereby substantially preventing inadvertent disengagement of the electrical cord from the receptacle.

According to an embodiment of another aspect of the present invention, the cover is constructed to provide an object clearance zone to prevent damage to the cover when the blower-vacuum is seated on the ground or other supporting surface. For example, the cover includes an inverted face directed upwardly towards the inlet of the blower to form the object clearance zone. Thus, debris located on the ground is less likely to damage the cover when setting the blower upon the ground.

Other aspects and features of the invention will become apparent to those ordinarily skilled in the art upon review of the following description of specific embodiments of the invention in conjunction with the accompanying figures.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
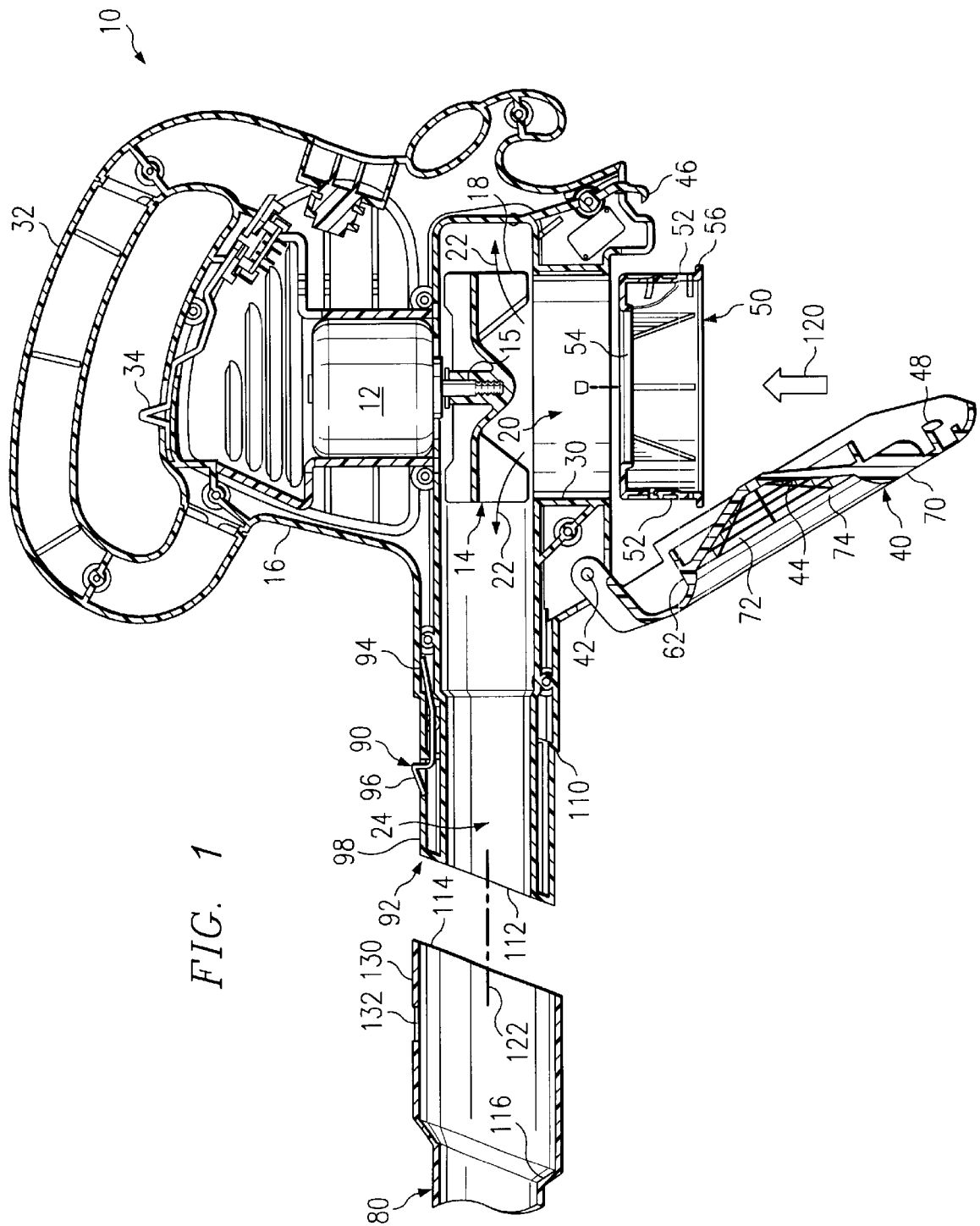
FIG. 1 is a diagram illustrating an exploded section view of a portable blower-vacuum in accordance with an embodiment of the present invention.
Figure 2:
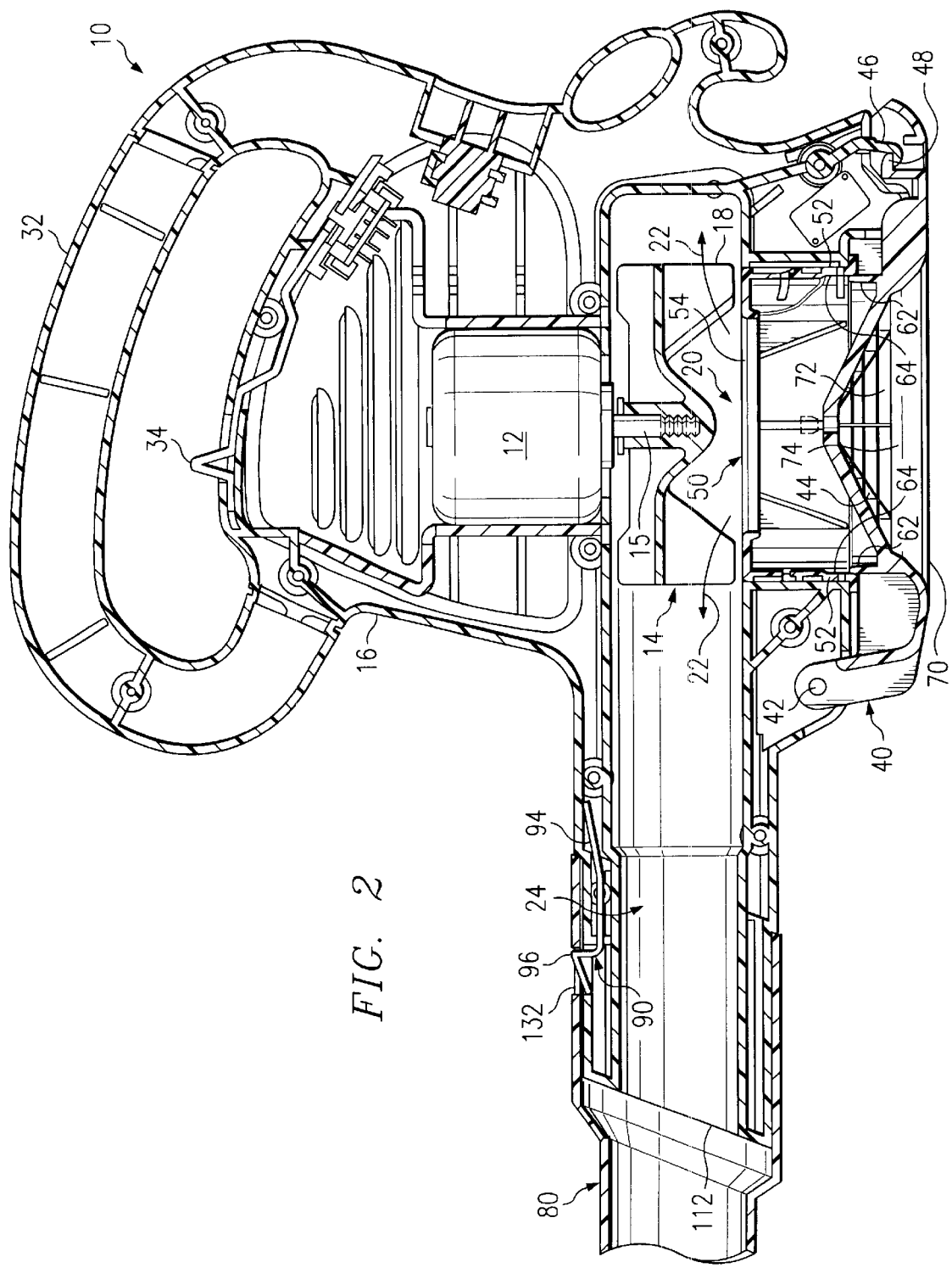
FIG. 2 is a diagram illustrating an assembled section view of the portable blower-vacuum illustrated in FIG. 1 in a blower application in accordance with an embodiment of the present invention.

FIG. 1 is a diagram illustrating an exploded section view of a portable blower-vacuum 10, and FIG. 2 is a diagram illustrating an assembled section view of the blower-vacuum 10 illustrated in FIG. 1. In this embodiment, the blower-vacuum 10 includes a motor 12 and an impeller 14 disposed within a housing 16. The motor 12 may comprise an electric motor, internal combustion engine, or other type of power supply for imparting a rotational force to the impeller 14 via a spindle or output shaft 15. The operation and construction of the motor 12 is conventional and, therefore, the windings, magnets, pistons, or other components associated with the motor 12 have been omitted in FIGS. 1 and 2 for clarity. The impeller 14 includes a plurality of vanes 18 extending downwardly toward an inlet 20 of the housing 16. In response to rotational movement of the impeller 14 relative to the housing 16, an airflow is drawn into the inlet 20 and flows radially about the impeller 14, as indicated generally by arrows 22. The shape of the housing 16 directs the radial flow of air toward an outlet 24 of the housing 16.

In the embodiment illustrated in FIGS. 1 and 2, the inlet 20 is defined by a wall 30. The wall is preferably annular, thereby defining an air inlet 20 of generally circular cross-section. However, other geometric configurations may also be used to form the inlet 20. The wall 30 may also be formed of varying lengths to correspondingly form varying lengths of the inlet 20. The housing 16 is also constructed having an integrally formed handle 32 to facilitate manipulation of the blower-vacuum 10 during use; however, the handle 32 may also be constructed as a discrete member adapted to be attached to the housing 16. A switch 34 is disposed proximate to the handle 32 and coupled to the motor 12 for turning the motor 12 on or off. The switch 34 may also be used to vary the motor 12 speed to accommodate variable airflow speeds. Electrical wiring and various connections for interconnecting the switch 34, motor 12, and power are conventional and, therefore, have been omitted in FIGS. 1 and 2 for clarity.

The blower-vacuum 10 also comprises an air inlet cover 40 coupled to the housing 16. In a preferred embodiment illustrated in FIGS. 1 and 2, the cover 40 is rotatably coupled to the housing 16 via a hinge 42, thereby providing rotatable movement of the cover 40 relative to the housing 16. However, other suitable devices or methods may be used to movably couple the cover 40 to the housing 16. Thus, according to the illustrated embodiment, the cover 40 remains coupled to the housing 16 in the open position or vacuum configuration; however, the cover 40 may also be coupled to the housing in a manner that may be completely removed from the housing 16. The cover 40 includes a plurality of apertures 44 that operate to substantially prevent debris from entering the inlet 20 while allowing the airflow to enter the inlet 20. The apertures 44 of the cover 40 are illustrated in greater detail in connection with FIGS. 4 and 5. The cover 40 is releasably secured to the housing 16 when in a closed position for operation in a blower mode, as best illustrated in FIG. 2, by engaging, for example, a latching mechanism 46 coupled to the housing with a locking hook 48 of the cover 40.

In the embodiment illustrated in FIGS. 1 and 2, the blower-vacuum 10 also includes an insert 50 adapted for narrowing a diameter of the inlet 20 when inserted during blower mode, and removed in vacuum mode. For example, the insert 50 includes an outer annular wall 52 adapted to cooperate with the wall 30, thereby effectively reducing the cross-sectional area of the inlet 20 to a cross-sectional area associated with a central opening 54 of the insert 50. When inserted, the insert 50 defines an inlet opening of dimensions at which the impeller works more efficiently, thereby resulting in higher volume and average airflow velocity being generated in the blower mode. The insert 50 may also include an outwardly extending annular lip 56 to limit inward movement of the insert 50 relative to the housing 16 to a predetermined location relative to the impeller 14. However, as described in greater detail in conjunction with FIG. 3, the blower-vacuum 10 may also be configured without the insert 50.

The blower-vacuum 10 also includes a skirt or collar adapted to cooperate with the inlet 20 and the cover 40 to maintain a substantially columnar airflow into the inlet 20 by eliminating or substantially reducing an airflow from entering the inlet 20 from a lateral direction relative to the inlet 20. These lateral airflows may result from spaces between the cover and the housing when the cover is attached to the housing. For various reasons, the cover for an air inlet may be designed so that it does not fit tightly against the housing or structure defining an entrance to an air inlet. It has not been appreciated that air which is drawn in laterally from gaps between the cover and the portion of a leaf blower-vacuum defining an air inlet will introduce turbulence into the predominate flow of air into the air inlet through openings or apertures in the cover. Turbulence interferes with air flow into an inlet, which may not allow the impeller to work as efficiently. In the illustrated embodiment, the skirt comprises an annular ring 62 depending from the cover 40 and sized to cooperate with an interior portion 64 the wall 52 to substantially reduce or eliminate an airflow from laterally entering the inlet 20 between the sides of the cover 40 and thereby bypassing the apertures 44. Thus, as best illustrated in FIG. 2, the ring 62 is sized having a vertical dimension to extend beyond, or overlap, the wall 52 of the insert 50. However, if no insert 50 is used, for example, the skirt may be otherwise positioned relative to the walls defining an air inlet to eliminate or substantially reduce lateral airflow into the inlet 20. Additionally, in the illustrated embodiment, the annular ring 62 that functions as a skirt is constructed as an integral member of the cover 40 to provide accurate positioning and/or alignment of the skirt relative to the inlet 20 and to prevent possible misplacement of the skirt by a user; however, the skirt may also be constructed as a separate element adapted to cooperate with the cover 40 and inlet 20.

As best illustrated in FIG. 2, the cover 40 includes a support face 70 adapted to support the blower-vacuum 10 in an upright position, such as upon the ground or other supporting surface. The face 70 may be configured having a substantially planar configuration to accommodate generally flat support surfaces; however, the face 70 may also be configured having other suitable geometric configurations to provide upright support for the blower-vacuum 10. The cover 40 also includes an inverted grill 72 extending inwardly from the face 70. In the embodiments illustrated in FIGS. 1 and 2, the grill 72 is constructed having a generally conical configuration; however, other suitable geometric configurations may be used to form the face 72 to provide an object clearance zone 74 between the grill 72 and a supporting surface. Due to its function, it is preferred to increase the open area of the grill 72 to reduce the restrictive effect the grill 72 may have on airflow. However, reducing the thickness of the grill member may tend to make them weaker. By providing the object clearance zone 74 for accommodating potentially damaging debris located on a supporting surface, such as small rocks, the opportunity for damage to the grill 72 as the blower-vacuum 10 is placed on a supporting surface is reduced.

In the embodiment illustrated in FIGS. 1 and 2, the blower-vacuum 10 also includes a discharge tube 80 adapted to cooperate with the outlet 24 when the blower-vacuum 10 is operated in a blower mode. A latching mechanism 90 is disposed proximate to a distal end 92 of the outlet 24 to secure the discharge tube 80 to the outlet 24. In the illustrated embodiment, the latching mechanism 90 includes a biasing portion 94 and an actuation portion 96 extending upwardly relative to an outer wall 98 of the outlet 24.

The outlet 24 also includes engagement faces 110 and 112 adapted to cooperate with corresponding engagement faces 114 and 116, respectively, of the discharge tube 80 to ensure proper alignment of the discharge tube 80 relative to the outlet 24 and to provide ease of installation of the discharge tube 80 to the outlet 24. For example, in the illustrated embodiment, the airflow enters the inlet 20 via the apertures 44 of the cover 40 in a direction indicated generally by the axis 120, which is substantially orthogonal to the airflow discharged via the outlet 24 indicated generally by axis 122 of the discharge tube 80 and outlet 24. As illustrated in FIGS. 1 and 2, the engagement faces 112 and 114, which are defined by the edges of the distal end 92 of the outlet 24 and end 130 of the tube 80, are disposed in a substantially non-orthogonal geometric relationship relative to the axis 122. For example, in the illustrated embodiment, the engagement faces 112 and 114 are disposed at an angle of approximately seventy degrees relative to the axis 122. In operation, an end 130 of the discharge tube 80 is disposed over or slid over the end 92 of the outlet 24. The non-orthogonal geometry of the engagement faces 112 and 114 not only clearly indicates visually the proper alignment of the discharge tube 80 with the outlet 24 such that an opening 132 of the discharge tube 80 becomes aligned with the actuation portion 96 of the latching mechanism 90, but also facilitates the sliding of the tube 80 over the outlet 24. As the opening 132 is positioned over the actuation portion 96, the actuation portion 96 extends upwardly into the opening 132, thereby securing the discharge tube 80 to the outlet 24.

Figure 3:
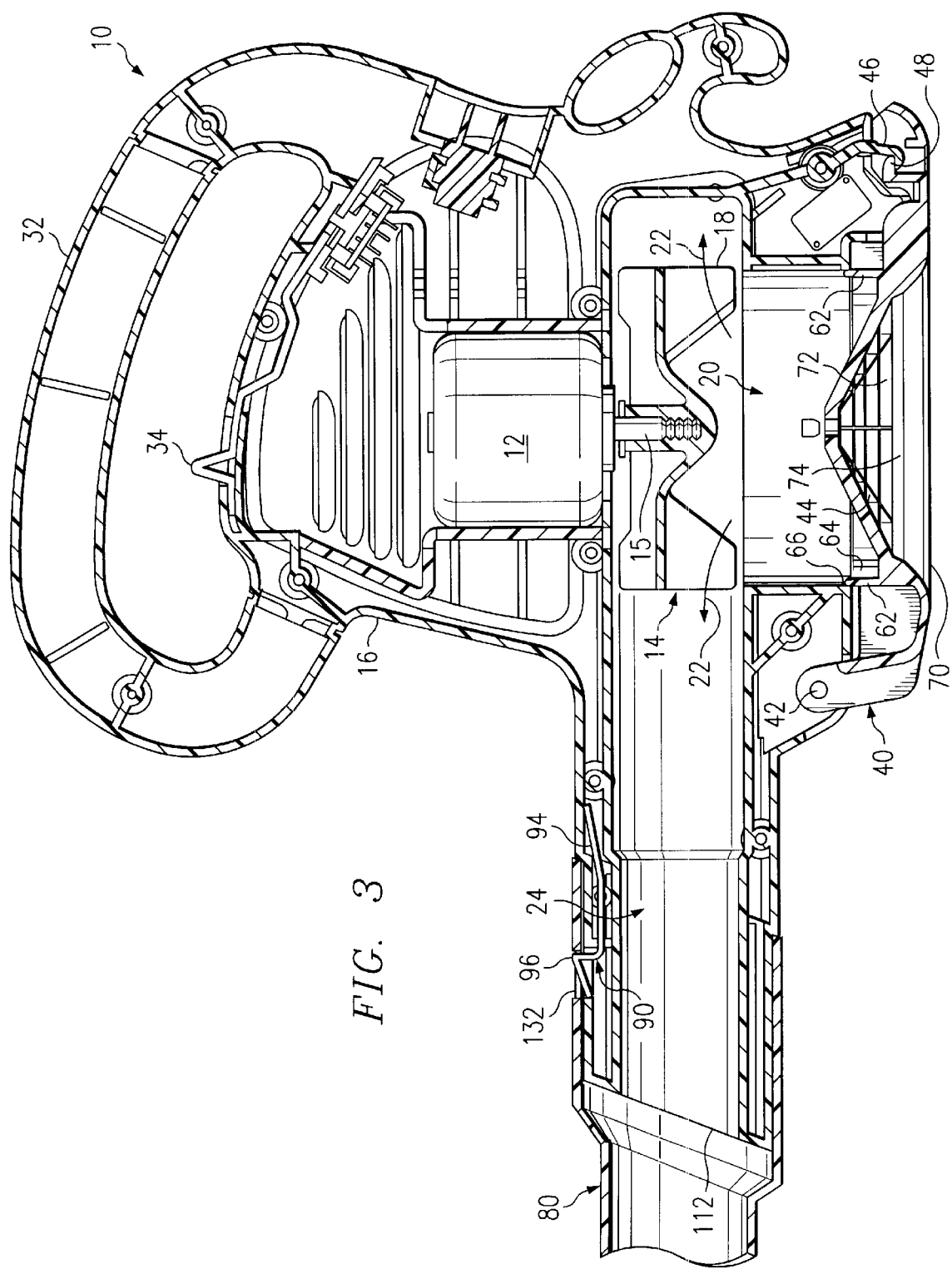
FIG. 3 is a diagram illustrating a section view of a portable blower-vacuum in accordance with another embodiment of the present invention.

FIG. 3 is a diagram illustrating the blower-vacuum 10 in accordance with another embodiment of the present invention. In this embodiment, the blower-vacuum 10 is illustrated without the insert 50. In the illustrated embodiment, a skirt for reducing or eliminating lateral airflow is comprised of the ring 62 that forms a cylindrical wall extending generally in the direction of the axis of rotation of the impeller 14. The ring 62 is adapted to cooperate with the inlet 20 to substantially reduce or eliminate a lateral airflow from entering the inlet 20. As described above, the ring 62 may be configured as an integral member of the cover 40, as illustrated in FIG. 3. Alternatively, it may be constructed as a separate element adapted to cooperate with the inlet 20 and the cover 40, and, preferably, attached to the cover 40. In the illustrated embodiment, the ring 62 of the cover 40 extends vertically such that an end 64 of the ring 62 is disposed proximate to an end 66 of the wall 52. For example, the end 64 of the ring 62 may extend beyond or overlap the end 66 of the wall 52 to substantially prevent lateral airflow from entering the inlet 20. However, the ring 62 may be otherwise positioned relative to the inlet 20 and the cover 40 to substantially prevent a lateral airflow from entering the inlet 20, thereby maintaining a substantially columnar airflow pattern directed toward the inlet 20.

Figure 4:
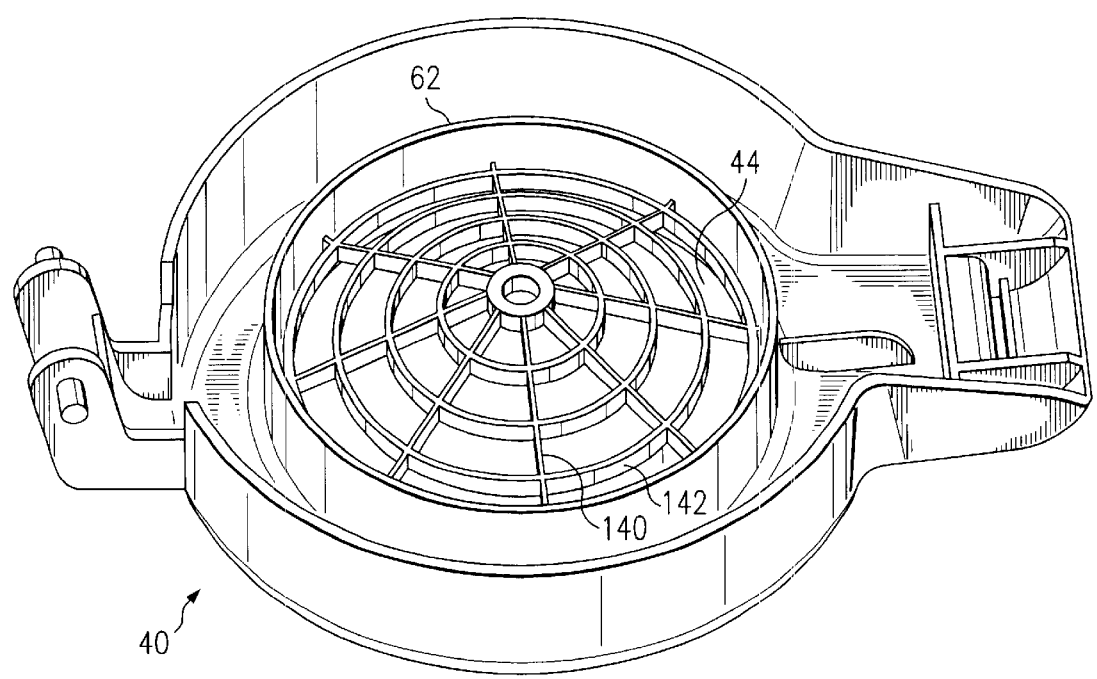
FIGS. 4 and 5 are diagrams illustrating an air inlet cover of the blower-vacuum illustrated in FIGS. 1–3 in accordance with an embodiment of the present invention.
Figure 5:
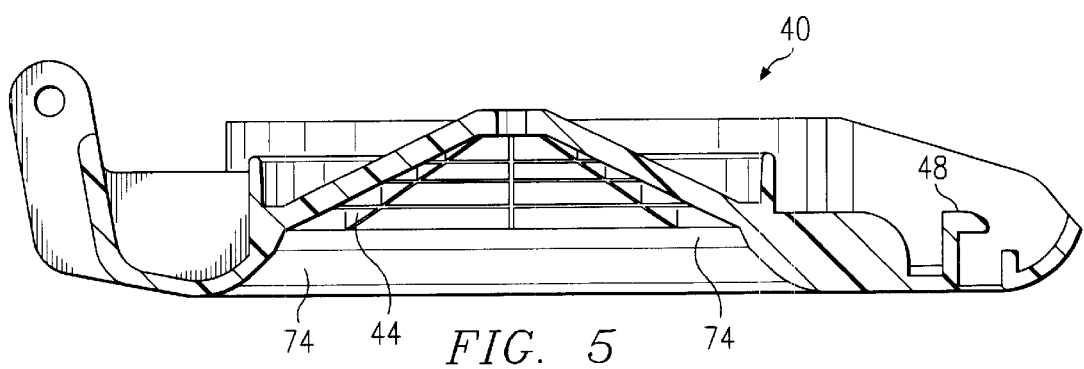

FIGS. 4 and 5 are diagrams illustrating the cover 40 in accordance with an embodiment of the present invention. As best illustrated in FIG. 4, the apertures 44 are defined by a plurality of radially extending support members 140 and a plurality of concentrically disposed annular support members 142. Thus, in the illustrated embodiment, the apertures 44 comprise arcuately formed openings to provide an airflow to the inlet 20; however, the apertures 44 may be otherwise configured having other suitable geometric configurations. Referring to FIG. 5, the grill 72, as defined by the support members 140 and 142, is configured having a generally conical geometry to provide the object clearance zone 74 as described above. However, it should be understood that other suitable geometric configurations of the grill 72 may be used to provide the object clearance zone 74 to provide a debris relief area between a supporting surface and the grill 72, thereby substantially preventing or reducing the likelihood of damage to the cover 40 upon the positioning of the blower-vacuum 10 on a supporting surface, such as the ground.

Figure 6:
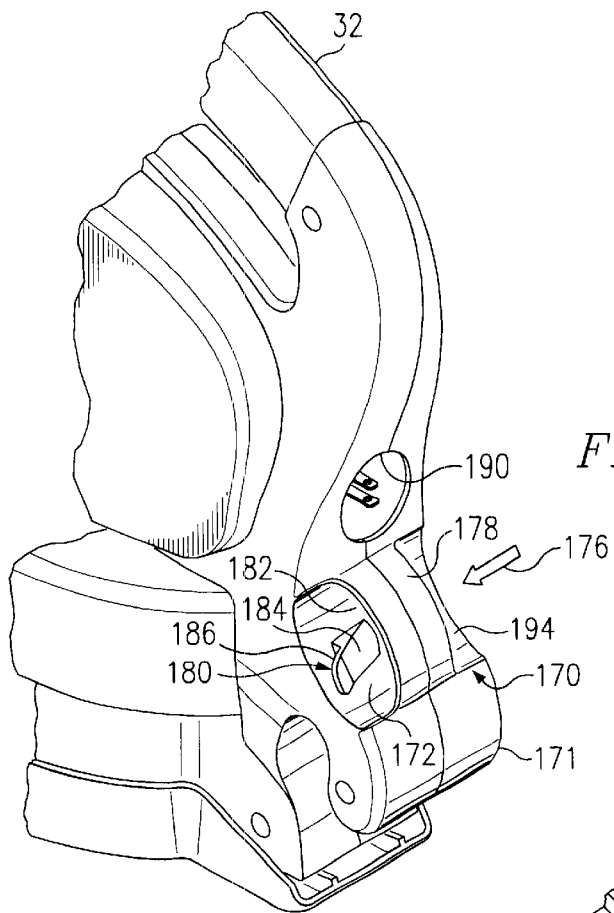
FIGS. 6 and 7 are diagrams illustrating a strain reliever of the blower-vacuum illustrated in FIGS. 1–3 in accordance with an embodiment of the present invention.
Figure 7:
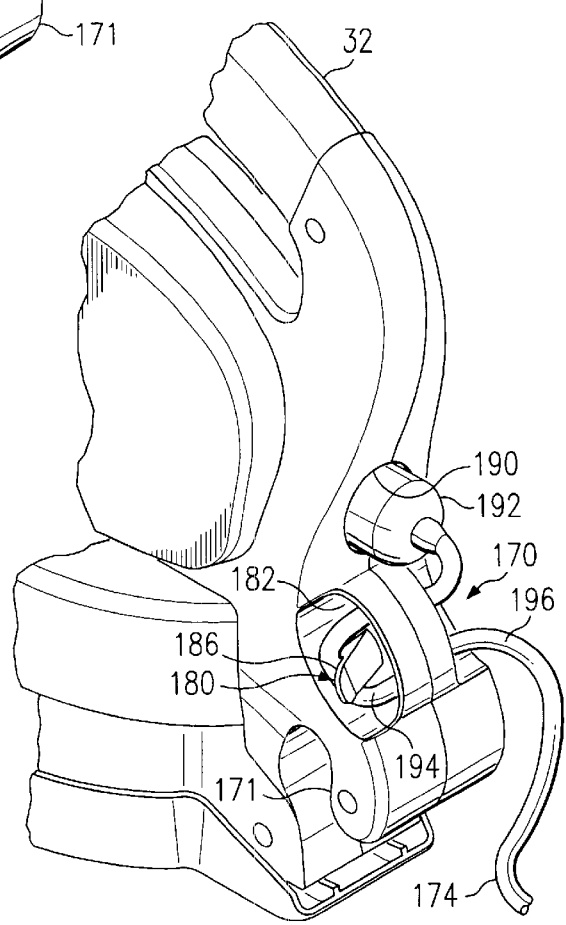

FIGS. 6 and 7 are diagrams illustrating one embodiment of a strain reliever 170 for a blower-vacuum. The strain reliever 170 is adapted to substantially prevent inadvertent disengagement of an electrical power supply from a blower-vacuum. In the illustrated embodiment, the strain reliever 170 is located on a rearward portion of the housing 16 between the handle 32 and a rearwardly disposed auxiliary handle 171. The strain reliever 70 comprises an opening 172 adapted for receiving a supply line 174, such as an electric cord as shown, associated with the power supply in a direction indicated generally at 176. In this embodiment, the opening 172 is defined by an integrally formed member 178 of the housing 16 extending rearwardly from the housing 16, thereby forming a generally oval or elliptically configured opening 172.

The strain reliever 170 also comprises a cleat 180 disposed proximate to an outlet 182 of the opening 172. The cleat 180 comprises an integrally formed support member 184 disposed at an upwardly directed angle relative to the opening 172. The support member 184 is formed in the direction indicated by 176 such that a portion of the supply line 174 may be disposed beneath the support member 184 in the area indicated generally at 186 after exiting the outlet 182. A receptacle 190 for receiving an end or plug 192 of the supply line 174 is disposed medially between an inlet 194 and the outlet 182 of the opening 172. The wall 178 of the opening 172 also functions to retain the supply line 174 in a substantially fixed position relative to the cleat 180 during movement of the blower-vacuum 10 during use.

Thus, in operation, a loop 194 is formed in the supply line 174 and is fed through the opening 172 in the direction indicated by 176. The plug 192 is then engaged with the receptacle 190 to provide electrical power to the blower-vacuum 10. The supply line 174 may then be tightened against the cleat 180 by drawing a portion 196 of the supply line 174 in a direction opposite the direction 176. Thus, the strain reliever 170 retains the supply line 174 in a substantially fixed position relative to the blower-vacuum 10 proximate to the receptacle 190. The strain reliever 170 also prevents disengagement forces from acting in a direction normal to the receptacle 190 resulting from use of the blower-vacuum 10, thereby substantially preventing inadvertent disengagement of the supply line 174 from the receptacle 190.

While the invention has been particularly shown and described by the foregoing detailed description, it will be understood by those skilled in the art that various other changes in form and detail may be made without departing from the spirit and scope of the invention.

What is claimed is:

1. A portable blower-vacuum, comprising:
 a housing having an inlet and an outlet, the outlet disposed along a first axis;
 a discharge tube adapted to cooperate with the outlet, the outlet and the discharge tube having complementary engagement faces, the engagement faces nonorthogonally disposed relative to the first axis;
 a motor disposed within the housing; and
 an impeller adapted to be rotatably driven by the motor to provide an airflow from the inlet to the outlet.

2. The blower-vacuum of claim 1, wherein the engagement faces are each disposed in a plane substantially non-orthogonal to the first axis.

3. The blower-vacuum of claim 1, wherein the engagement face of the outlet is disposed upwardly relative to the first axis.

4. The blower-vacuum of claim 1, wherein the motor comprises an electric motor, and further comprising a strain reliever adapted to substantially prevent inadvertent disengagement of an electrical power supply from the electric motor.

5. The blower-vacuum of claim 1, wherein the outlet comprises a plurality of substantially parallel engagement faces adapted to cooperate with a corresponding plurality of substantially parallel engagement faces of the discharge tube.

6. A portable blower-vacuum, comprising:
a housing having an inlet and an outlet, the inlet being defined by an annular wall;
a motor disposed within the housing;
an impeller rotatably driven by the motor to transfer an airflow from the inlet to the outlet;
a cover adapted to cooperate with the inlet, the cover comprising a plurality of apertures disposed relative to the inlet to provide an airflow to the inlet; and
a skirt adapted to cooperate with the annular wall defining the inlet and the cover to substantially reduce or eliminate a latent air-flow from entering the inlet from between the cover and the housing.

7. The blower-vacuum of claim 6, further comprising an insert adapted to cooperate with the inlet to decrease a diameter of the inlet proximate to the impeller, and wherein the skirt is adapted to cooperate with a central opening of the insert to substantially reduce or eliminate the lateral airflow from entering the central opening.

8. The blower-vacuum of claim 1, wherein the insert comprises an annular wall disposed proximate to the cover, and wherein the skirt comprises an annular ring adapted to overlap a portion of the annular wall of the insert.

9. The blower-vacuum of claim 6, wherein the skirt comprises an annular ring coupled to the cover and adapted to overlap a portion of the annular wall.

10. The blower-vacuum of claim 9, wherein the annular ring comprises an integrally formed wall of the cover.

11. The blower-vacuum of claim 6, wherein the cover further comprises:
a face adapted to support the blower-vacuum in an upright position; and
a grill disposed inwardly from the face, the apertures disposed in the grill.

12. The blower-vacuum of claim 11, wherein the grill is configured to provide an object clearance zone in the upright position between the grill and a supporting surface.

13. The vacuum-blower of claim 11, wherein the grill is configured having a substantially conical geometry.

14. The vacuum-blower of claim 6, wherein the motor comprises an electric motor, and further comprising a strain reliever adapted to substantially prevent inadvertent disengagement of an electrical supply from the electric motor.

15. A portable blower-vacuum, comprising:
a housing having an inlet and an outlet;
an electric motor disposed within the housing;
an impeller rotatably driven by the electric motor to provide an airflow from the inlet to the outlet;
a member extending rearwardly from the housing and defining an opening between the member and the housing adapted to receive a loop of an electrical supply line; and
a cleat disposed proximate to the opening and adapted to retain the loop to substantially prevent inadvertent disengagement of the electrical supply line from a receptacle associated with the electric motor.

16. The blower-vacuum of claim 15, wherein the member comprises an integrally formed member of the housing.

17. The blower-vacuum of claim 15, wherein the cleat comprises an angled clip disposed proximate to an outlet of the opening.

18. The blower-vacuum of claim 15, further comprising:
a first handle; and
a second handle, the member and the cleat disposed between the first and second handle.

19. The blower-vacuum of claim 18, wherein the second handle extends rearwardly from the housing.

20. The blower-vacuum of claim 18, wherein the cleat comprises an angled clip disposed proximate to an outlet of the opening.

21. The blower-vacuum of claim 15, wherein the member defines an elliptically configured opening.

22. The blower-vacuum of claim 15, wherein the cleat comprises an integrally formed member of the housing.

23. A portable blower-vacuum, comprising:
a housing having an inlet and an outlet;
a motor disposed within the housing;
an impeller rotatably driven by the motor to transfer an airflow from the inlet to the outlet; and
a covet adapted to cooperate with the inlet, the cover comprising an inwardly disposed conically-configured grill defining an object clearance zone, the object clearance zone providing a relief area for debris between the grill and a supporting surface.

24. The blower-vacuum of claim 23, wherein the grill comprises a plurality of apertures adapted to receive the airflow into the inlet.

25. The blower-vacuum of claim 23, wherein the motor comprises an electric motor, and further comprising a strain reliever adapted to substantially prevent inadvertent disengagement of an electrical supply line from the motor.

26. The blower-vacuum of claim 23, wherein the outlet is disposed along an axis, and further comprising a discharge tube adapted to cooperate with the outlet, the outlet and the discharge tube having complementary engagement faces, the engagement faces nonorthogonally disposed relative to the axis.

27. The blower-vacuum of claim 23, further comprising a skid adapted to cooperate with the cover and the inlet to substantially reduce or eliminate a lateral airflow from entering the inlet from between the cover and the housing.

28. A portable blower-vacuum comprising:
a housing having an inlet and an outlet;
a motor disposed within the housing;
an impeller rotatably driven by the motor to transfer an airflow from the inlet to the outlet;
a cover adapted to cooperate with the inlet, the cover comprising a plurality of apertures disposed relative to the inlet to provide an airflow to the inlet; and
a skirt depending from the cover and adapted to cooperate with the inlet and the cover to substantially reduce or eliminate a lateral airflow from entering the inlet from between thc covet and the housing.

29. The blower-vacuum of claim 28, wherein the skirt comprises an annular ring tat is adapted to overlap a portion of an annular wall defining the inlet opening.

30. The blower-vacuum of claim 28, further comprising an insert adapted to cooperate with the inlet to decrease a diameter of the inlet proximate to the impeller.

31. The blower-vacuum of claim 28, wherein the insert comprises an annular wall disposed proximate to the cover, and wherein the skirt comprises an annular ring adapted to overlap a portion of the annular wall of the insert.

* * * * *

UNITED STATES PATENT AND TRADEMARK OFFICE
CERTIFICATE OF CORRECTION

PATENT NO. : 6,640,384 B2
DATED : November 4, 2003
INVENTOR(S) : Sanders et al.

It is certified that error appears in the above-identified patent and that said Letters Patent is hereby corrected as shown below:

Column 7,
Line 17, change "latent air-flow" to -- lateral airflow --;
Line 25, change "1" to -- 7 --;

Column 8,
Lines 21 and 55, change "covet" to -- cover --;
Line 40, change "skid" to -- skirt --; and
Line 57, change "tat" to -- that --.

Signed and Sealed this

Twenty-seventh Day of January, 2004

JON W. DUDAS
*Acting Director of the United States Patent and Trademark Office*